INVENTOR
F. W. CHRISTENSEN
By C. A. Martine, J.
ATTORNEY

INVENTOR
F. W. CHRISTENSEN
BY C. Martine, J.
ATTORNEY

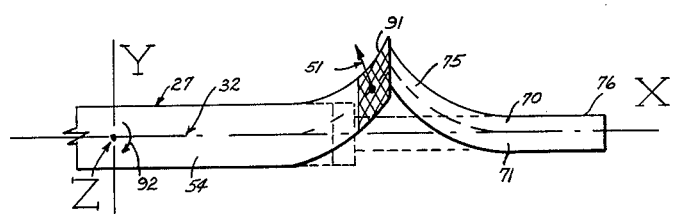
Fig_3A
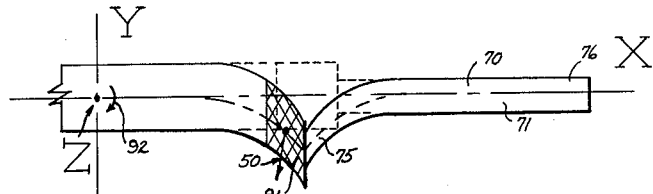
Fig_3B
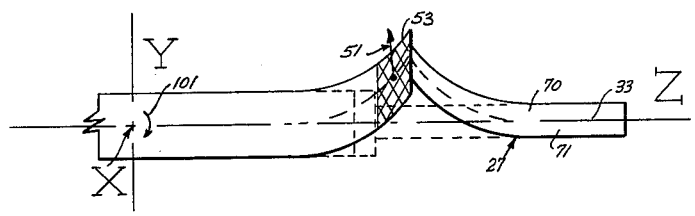
Fig_4A
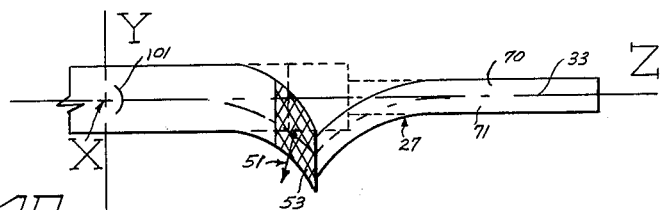
Fig_4B

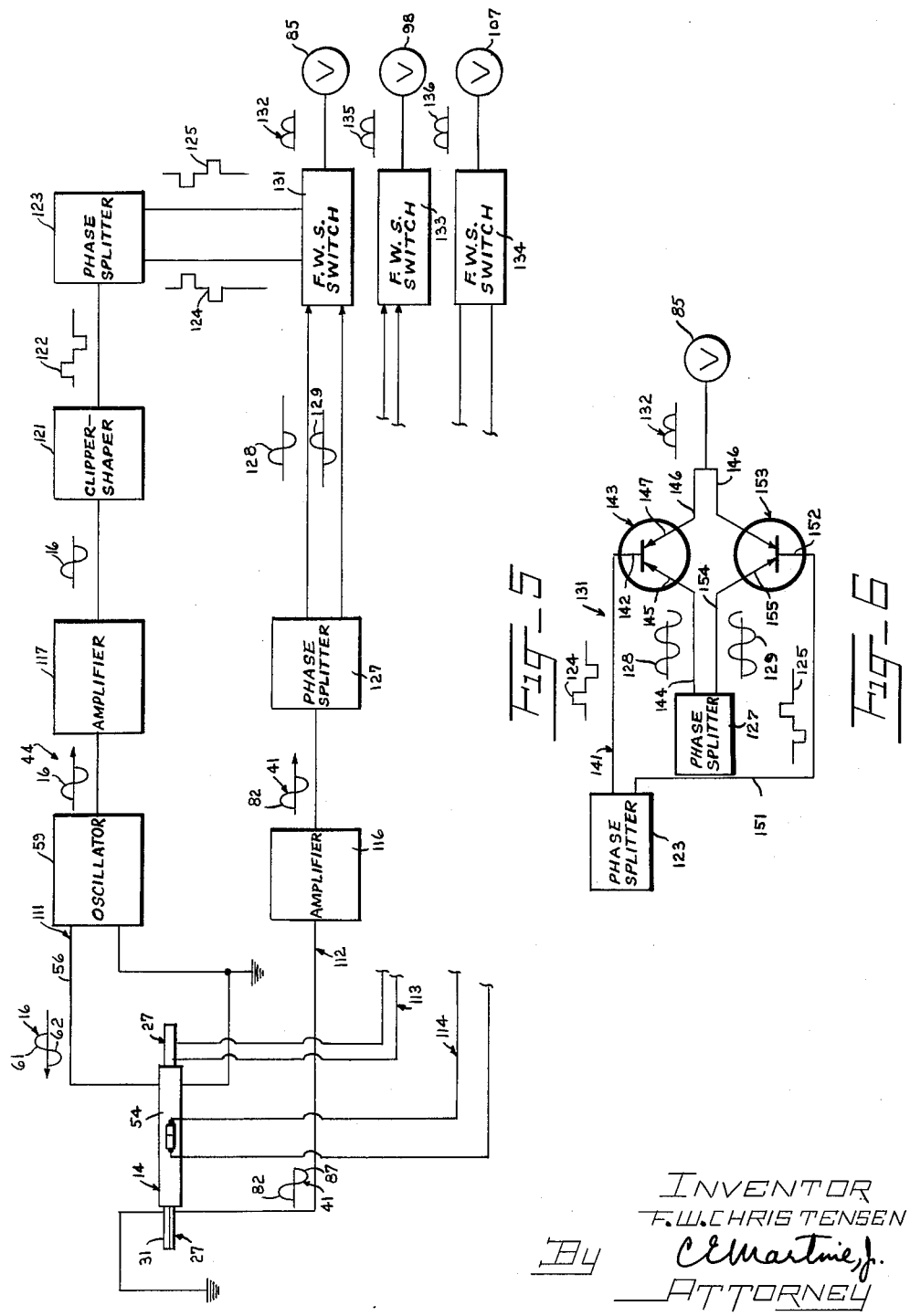

Sept. 21, 1965 F. W. CHRISTENSEN 3,206,985
APPARATUS FOR SIMULTANEOUSLY SENSING MOVEMENT OF A BODY
AROUND A PLURALITY OF MUTUALLY PERPENDICULAR AXES
Filed Jan. 4, 1963 5 Sheets-Sheet 5
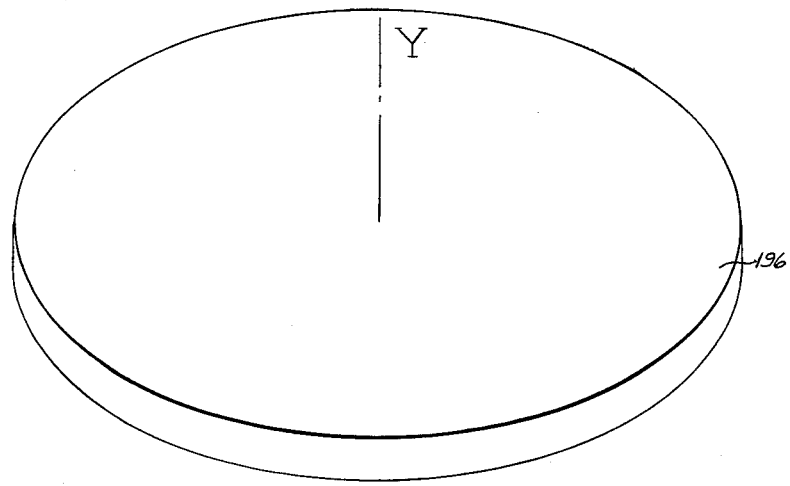
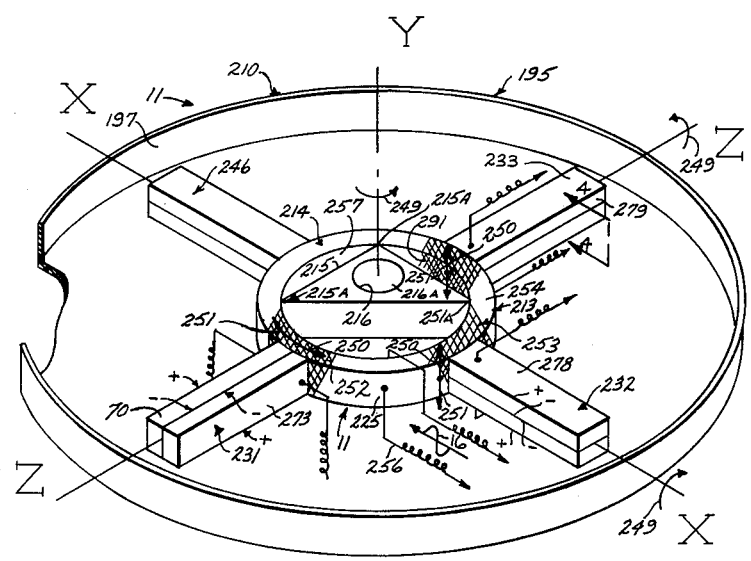
Fig. 7
INVENTOR
F. W. CHRISTENSEN
By C. E. Martine, Jr.
ATTORNEY

3,206,985
APPARATUS FOR SIMULTANEOUSLY SENSING MOVEMENT OF A BODY AROUND A PLURALITY OF MUTUALLY PERPENDICULAR AXES

Frank W. Christensen, Pennington, N.J., assignor to Western Electric Company, Incorporated, New York, N.Y., a corporation of New York
Filed Jan. 4, 1963, Ser. No. 249,369
6 Claims. (Cl. 73—505)

This invention relates to apparatus for sensing selected movements of a body and, more particularly, to apparatus for simultaneously indicating the rate of movement of a body around a plurality of mutually perpendicular axes.

In the guidance field, facilities utilizing mechanical gyroscopes have been successfully employed for guiding bodies, such as airplanes and the like. Characteristics, such as size and weight, have rendered such mehcanical gyroscopes of limited application in guiding space vehicles and other bodies in which minimum weight and size are prime considerations.

Attempts to provide facilities less subject to such size and weight limitations led to the development of facilities for changing the radius of gyration of inertia members. The inertia members are effective as space references which may be utilized in guidance facilities. Such inertia members, however, have necessarily been three-dimensional in configuration and, hence, still subject to significant size limitations.

Research conducted in an endeavor to provide gyroscopic facilities requiring a minimum of size and weight while possessing superior operational characteristics, has resulted in the development of a dynamically-balanced, substantially two-dimensional gyroscopic system for sensing movements of a body around a plurality of mutually perpendicular axes. The system is characterized by a low inherent mass which results in high resistance to shock. The system is further characterized by a high sensitivity to selected movement of a body, and, because of its minute size and compatibility with microminiature control devices, is adapted for use in facilities for guiding bodies, such as space vehicles, guided missiles, and the like.

It is an object of this invention to provide new and improved apparatus for sensing selected movements of a body.

Another object of this invention resides in the provision of a dynamically-balanced, substantially two-dimensional gyroscopic system for simultaneously indicating the rate of movement of a body around a plurality of mutually perpendicular axes.

Still another object of this invention is to provide for use in a guidance facility a gyroscopic unit for sensing the rotation of a body around predetermined orthogonal axes wherein the unit imparts no net force to the body.

A further object of the present invention resides in the provision of a generally disc-shaped gyroscopic unit including an annular, driven facility which renders a plurality of sensor instrumentalities mounted on the facility sensitive to rotation of a body around predetermined orthogonal axes.

With these and other objects in view, the present invention contemplates provision of a unit for sensing movement of a body around each of a plurality of orthogonal axes. The unit includes a plurality of sensor facilities wherein one such sensor facility is positioned perpendicular to and oriented for sensitivity to rotation of the body around each of the orthogonal axes for generating an output signal in response to a condition of stress therein. A driven member mounts the sensor facilities at 90° intervals on the outer periphery thereof in their oriented positions. The driven member is excited by an oscillating input signal for effecting the condition of stress in the sensor facilities upon movement of the body around each of the orthogonal axes. Circuitry responsive to the output signals generated by the sensor facilities is provided for indicating the rate of movement of the body around the orthogonal axes.

A complete understanding of the present invention may be had by referring to the following detailed description and the accompanying drawings illustrating a preferred embodiment thereof, in which:

FIG. 3A is a partial side view taken along the line 3—3 in FIG. 1 illustrating a second sensor flexed into a condition of stress by a decelerative force produced by the driven member upon an increase in the radius of gyration thereof and upon rotation of the body around a second of the axes;

FIG. 3B is a view similar to FIG. 3A showing the second sensor flexed into a condition of stress by an accelerative force produced by the driven member upon a decrease in the radius of gyration thereof;

FIG. 4A is a partial side view taken along the line 4—4 in FIG. 1 illustrating a third sensor flexed into a condition of stress by a decelerative force produced by the driven member upon an increase in the radius of gyration thereof and upon rotation of the body around a third of the axes;

FIG. 4B is a view similar to FIG. 4A showing the third sensor flexed into a condition of stress by an accelerative force produced by the driven member upon an decrease in the radius of gyration thereof;

FIG. 5 is a block diagram of an electrical circuit responsive to signals generated by the first, second and third sensors in response to said conditions of stress for indicating the rate of the selected movement around the axes;

FIG. 6 is a diagram of a full wave synchronous switch utilized in the electrical circuit of FIG. 5; and FIG. 7 is a perspective view of an embodiment of the apparatus shown in FIG. 1 suitable for commercial application and illustrating a substantially two-dimensional, disc-like container for housing the unit.

Figure 1:
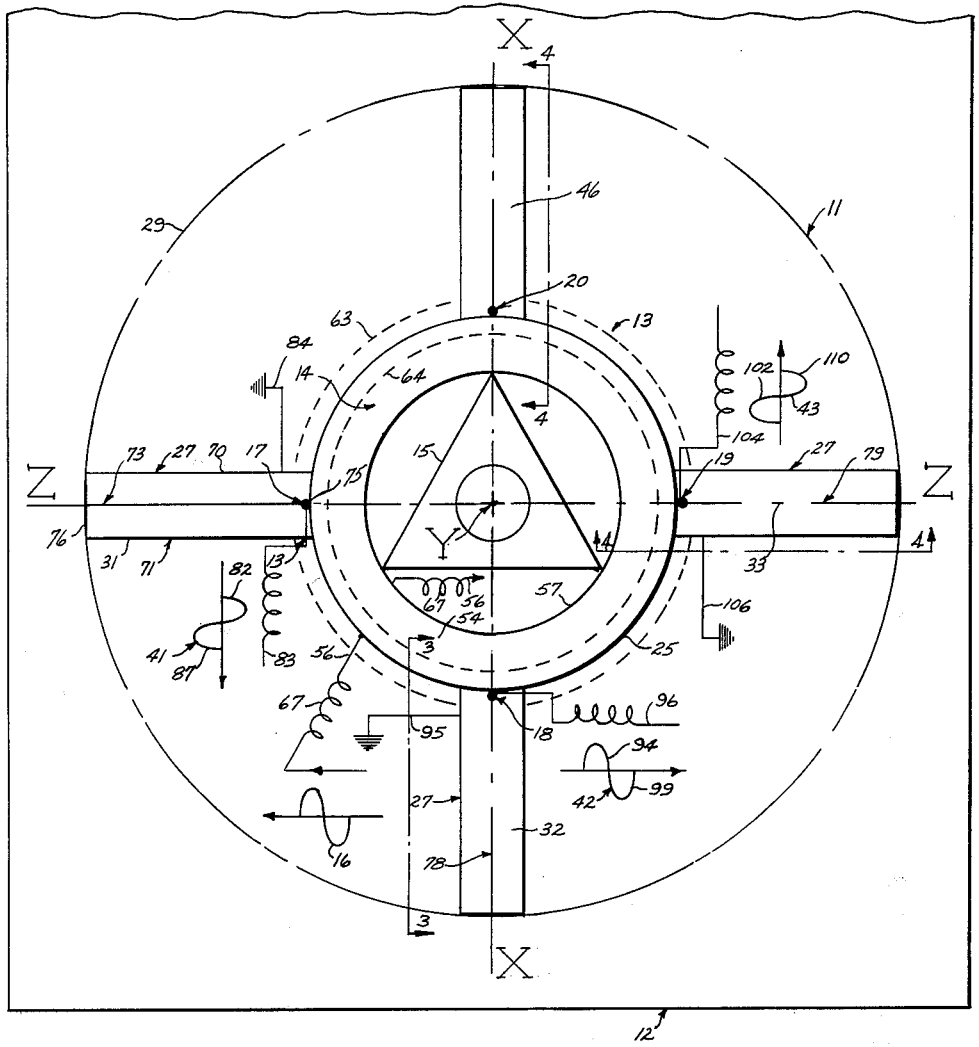
FIG. 1 is a plan view of an apparatus constructed according to the principles of the present invention showing a generally two-dimensional unit for sensing selected movement of a body around a plurality of mutually perpendicular axes wherein the radius of gyration of a driven member of the unit varies in response to an input signal.

Referring first to FIG. 1 of the drawings, there is shown a gyroscopic system 11 embodying the principles of the present invention for sensing selected movement of a body 12. Mutually perpendicular axes of sensitivity or reference axes, which may be yaw, pitch, and roll axes, such as the X, Y and Z axes, respectively, are shown to facilitate description of various movements of the body 12 which may be sensed by the system 11. Additionally, for simplicity of description, orthogonal or mutually perpendicular axes, such as the X, Y and Z axes of the body 12, are shown coincident with the respective X, Y and Z reference axes. It is to be understood, however, that the system 11 may be sensitive to movements of the body 12 when the respective reference and body axes are parallel and thus positioned in spaced relationship. The system 11 may be utilized to correct or compensate for the sensed movement of the body so that the system is held against rotation around the X, Y and Z axes in the manner of a space reference device, such as an attitude gyroscope. The system 11 is referred to as "gyroscopic" in this sense.

The system 11 shown in FIG. 1 may, in general, include a substantially two-dimensional unit 13 provided with a driven member 14 that is mounted to the body 12 by a resilient support 15. The driven member 14 is excited at its resonant frequency in its radial mode by a driving or oscillatory input signal 16 for experiencing oscillatory excursion in the X–Z plane. The oscillatory excursion is effective to cyclically vary the radius of gyration of the driven member 14. The X and Z axes of the driven member 14 are shown intersecting the driven member for defining four quadrature points 17, 18, 19 and 20 on the outer circumference or peripheral surface 25 of the driven member 14.

The unit 13 may further include a plurality of sensor members, generally designated by the reference numeral 27. The driven member 14, being thin and lying within a plane, such as the X–Z plane, supports the sensor members 27 in the X–Z plane within a dashed outline 29 which represents the outline of a disc-like member. In this respect, the unit 13 is referred to as a substantially two-dimensional, disc-like unit.

The sensor members 27, including first, second and third sensors 31, 32 and 33, respectively, are mounted to the driven member 14 at the quadrature points 17, 18 and 19, respectively, and extend along the respective X and Z reference axes. The first, second and third sensors 31, 32 and 33, respectively, are oriented for sensitivity to rotation of the body 12 around the Y, Z and X axes, respectively, so that in response to such rotation of the body, the first, second and third sensors are adapted to generate first, second and third output signals 41, 42 and 43, respectively. In response to the output signals 41, 42 and 43, a circuit 44 (FIG. 5) indicates the rate of rotation of the body around the Y, Z and X axes, respectively.

At the fourth quadrature point 20, a bar or balance member 46 is mounted to the outer circumference 25 of the driven member 14 for dynamically balancing the unit 13. The bar 46 is provided with the same configuration and mass as the first, second and third sensors 31, 32 and 33, respectively, to effectuate this result.

When the body 12 is stationary, the oscillatory excursion of the driven member 14 in response to the input signal 16 excites the first, second and third sensors 31, 32 and 33, respectively, in their respective longitudinal modes of vibration. Upon rotation of the body 12 at an unknown rate around the X axis, for example, the driven member 14 and the first and third sensors 31 and 33, respectively, rotate around the X axis at the unknown rate. As the driven member 14 rotates at the unknown rate, a cyclic Coriolis effect is experienced by the driven member 14 as a result of the cyclic change in the radius of gyration of the driven member.

In response to the Coriolis effect, and referring now, in general, to FIGS. 2A, 2B, 4A and 4B, alternate accelerative and decelerative forces 50 and 51, respectively, are applied to sections 52 and 53, respectively (shown in cross-hatched lines), of the driven member 14. The sections 52 and 53 impart vibration at their resonant frequency and in their transverse mode to the first and third sensors 31 and 33, respectively. Because the first sensor 31 is oriented for sensitivity to rotation around only the Y axis, such vibration in the transverse mode thereof does not render the first sensor 31 effective to produce the first output signal 41 (FIG. 1). However, the orientation of the third sensor 33 is such that the vibration in the transverse mode renders the sensor 33 effective to generate the third output signal 43 having the frequency of the input signal 16 and both phase and amplitude that are proportional to the unknown rate of rotation of the body 12 around the X axis. Rotation of the body 12 around the Y and Z axes similarly renders the first and second sensors 31 and 32, respectively, effective to produce or generate the first and second output signals 42 and 43, respectively, (FIG. 1) which are indicative of the rate and direction of rotation of the body 12 around the Y and Z axes, respectively.

Referring now in detail to FIG. 1, the driven member 14 is shown annular in configuration, having the form of a toroid or ring 54. The toroid 54 may be constructed form piezoelectric material of the piezo-ceramic type, such as barium titanate of lead zirconium titanate. Leads or conductors 56 are secured to an inner peripheral surface 57 and to the outer peripheral surface 25 for supplying the input signal 16 from a voltage source or oscillator 59 (FIG. 5) to the toroid 54.

In response to a first half cycle 61 (FIG. 5) of the input signal 16, the toroid 54 is excited at its resonant frequency and vibrates radially in the X–Z plane so that the outer peripheral surface 25 thereof advances through a maximum excursion outwardly, for example, to the position represented by the dash line 63. Similarly, the dash line 64 represents the position of the outer periphery 25 assumed upon maximum inward excursion of the toroid 54 in response to a next half-cycle 62 of the input signal 16. Coils 67 are provided adjacent to the connection between the leads 56 and the toroid 54 to preclude damping of the inward and outward excursion of the toroid.

The first, second and third sensors 31, 32 and 33, respectively, are similar in construction. Accordingly, for simplicity of description, the construction of only the first sensor 31 will be described, it being understood that the second and third sensors may be constructed in a similar manner. The first sensor 31 may be fabricated from a single, elongated, rectangular bar of piezoelectric material. Preferably, the first sensor 31 includes two elongated strips, 70 and 71, each having a thin rectangular cross section. The strips 70 and 71 may be fabricated from piezoelectric crystals of the piezo-ceramic type, such as barium titanate or lead zirconium titanate, and are assembled by a suitable adhesive to form a bimorphic element 73. The bimorphic element 73 of the first sensor 31 is adhesively mounted at the first quadrature point 17 to the outer peripheral surface 25 of the toroid 54. The first sensor 31 may be one-quarter of an acoustical wavelength and mounted to the toroid 54 so that a fixed end 75 thereof is an anti-nodal point and a free end 76 thereof is a nodal point. Accordingly, the excursion of the toroid 54 in the X–Z plane effects excursion of only the fixed-end 75 in the direction of the longitudinal axis thereof when the body 12 is not rotating around the Y axis.

It will be recalled that the toroid 54 is driven at its resonant frequency and vibrates the sensor members 27 at that frequency in both their longitudinal and transverse modes of vibration when the body 12 rotates around the X, Y and Z reference axes. It may be understood then that the bimorphic elements 73, 78 and 79 of the first, second and third sensors 31, 32 and 33, respectively, are adapted to resonate at the resonant frequency of the toroid 54. Accordingly, the amplitude of the transverse mode of vibration of the anti-nodal, fixed ends 75 of the bimorphic elements 73, 78 and 79, and, hence, the amplitude of the output signals 41, 42 and 43 will be a maximum for any rotation of the body 12 around the X, Y and Z axes.

Figure 2A:
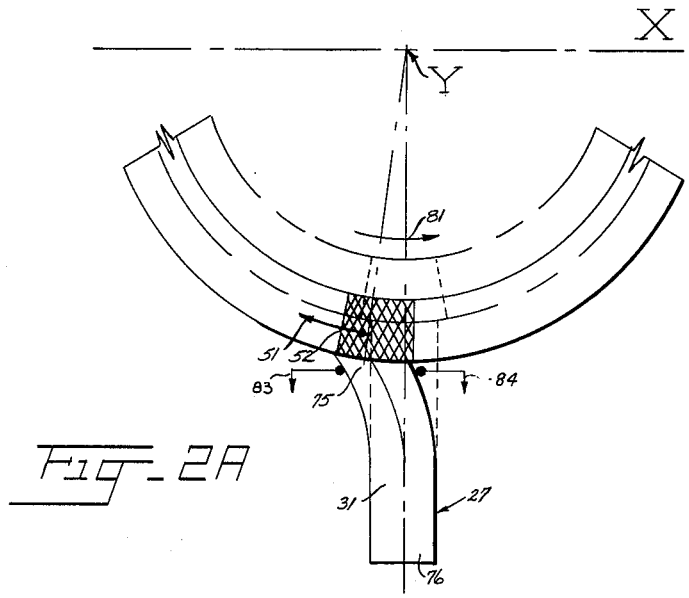
FIG. 2A is a partial plan view of the apparatus shown in FIG. 1 illustrating a first sensor flexed into a condition of stress by a decelerative force produced by the driven member upon an increase in the radius of gyration thereof and upon rotation of the body around a first of the axes.
Figure 2B:
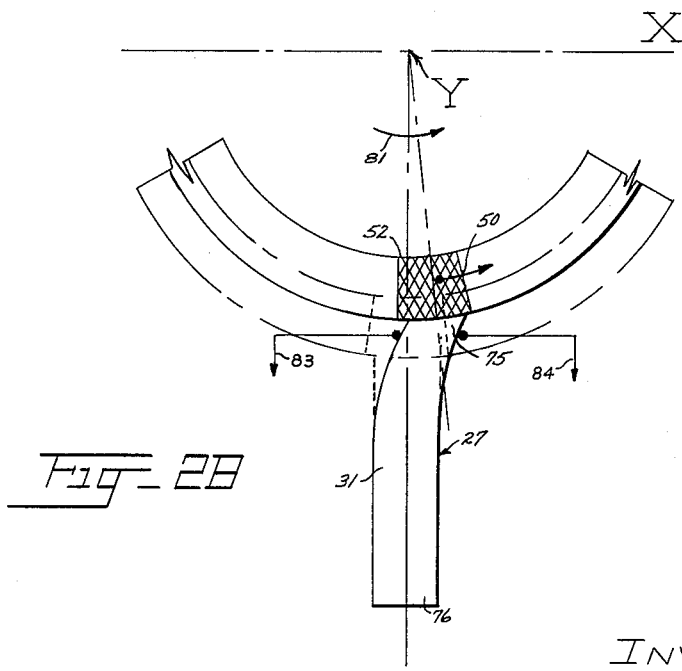
FIG. 2B is a view similar to FIG. 2A showing the first sensor flexed into a condition of stress by an accelerative force produced by the driven member upon a decrease in the radius of gyration thereof.

Attention is now directed to FIG. 2A for a detailed description of the transverse mode of vibration of the first sensor 31 upon rotation of the body 12 around the Y axis. The first sensor 31 is so mounted that the adjacent faces of the strips 70 and 71 are parallel to the Y axis, rendering the first sensor sensitive to rotation of the body 12 around the Y axis. It may be recalled that upon rotation of the body 12 at an unknown rate around the Y axis, the toroid 54 and the first sensor 31 rotate around the Y axis at the same rate. As the toroid 54 rotates at such rate, the cyclic radial excursion of the section 52 of the toroid effects the cyclic change in the radius of gyration of the section. Such change in the radius of gyration imparts the alternately acting, accelerative and decelerative forces 50 and 51, respectively, to the section 52 as a result of the Coriolis effect.

As shown in FIG. 2A, with the body rotating in the direction of the arrow 81 and during a first half cycle 61 of the input signal 16, the excursion of the toroid 54 may be radially outward, for example. During such radially outward excursion, the force 51 decelerates the section 52 so that the section lags the free end 76 of the sensor 31. It will be recalled that the free end 76 of the sensor is a nodal point and, hence, continues to rotate at the unknown rate. The fixed end 75, which is the anti-nodal point of the first sensor 31, is decelerated by the section 52 and, as a result, effects a condition of stress in the sensor 31. In response to the condition of stress, the sensor 31 flexes, as shown in FIG. 2A, and generates a pulse 82 (FIGS. 1 and 5).

Leads 83 and 84, adhesively connected to the fixed end 75 of the sensor 31 for electrical and mechanical contact therewith, conduct the pulse 82 to the circuit 44 (FIG. 5). A first meter 85 provided in the circuit 44 is responsive to the phase and amplitude of the pulse 82 for indicating the rate and direction of rotation of the body 12 around the Y axis.

During the next half-cycle 62 of the input signal 16, and with the body 12 rotating in the same direction (as indicated by the arrow 81 in FIG. 2B), the excursion of the toroid 54 may be taken as radially inward. At this time, the radius of gyration of the section 52 decreases, whereupon the Coriolis effect imparts the accelerative force 50 to the section. The accelerative force 50 accelerates the fixed end 75 of the first sensor 31 relative to the free end 76 and, as a result, effects a condition of stress in the first sensor. In response to the condition of stress, the first sensor 31 flexes in the opposite direction and generates a pulse 87 having a polarity opposite to the polarity of the pulse 82. The phase and amplitude of the pulse 87 are proportional to the rate of rotation of the body 12 around the Y axis. The first meter 85 is responsive to the pulse 87 for indicating the rate and direction of the rotation of the body 12 around the Y axis.

Attention is now directed to FIGS. 3A and 3B for a detailed description of the second sensor 32 and its operation upon rotation of the body 12 around the Z axis. The second sensor 32 is so mounted to the toroid 54 that the adjacent faces of the strips 70 and 71 thereof are parallel to the X-Z plane, rendering the second sensor 32 sensitive to rotation of the body 12 around the Z axis.

It may be understood that upon rotation of the body 12 at an unknown rate around the Z axis, the toroid 54 and the second sensor 32 rotate around the Z axis at the same rate. As the toroid 54 rotates at such rate, the cyclic excursion of the toroid 54 effects a cyclic change in the radius of gyration of a section 91 (shown in cross-hatching) of the toroid. Such change in the radius of gyration imparts the cyclically acting, accelerative and decelerative forces 50 and 51, respectively, to the section as a result of the Coriolis effect.

As shown in FIG. 3A, with the body 12 rotating in the direction of the arrow 92, and during a first half cycle of the input signal 16, the excursion of the toroid 54 may be radially outward, for example. During such radially outward excursion, the decelerative force 51 is applied to the section 91. It will be recalled that the free end 76 of the second sensor 32 is a nodal point, and, hence, continues to rotate at the unknown rate. The fixed end 75, which is the anti-nodal point of the second sensor 32, is decelerated with the section 91 by the force 51 and, as a result, lags the free end 76, effecting a condition of stress in the second sensor 32. In response to the condition of stress, the second sensor 32 flexes, as shown in FIG. 3A, and generates a pulse 94 (FIG. 1).

Leads 95 and 96 (FIG. 1), adhesively connected to the fixed end 75 of the second sensor 32 for electrical and mechanical contact therewith, conduct the pulse 94 to the circuit 44. A second meter 98 energized by the circuit 44 is responsive to the phase and amplitude of the pulse 94 for indicating the rate and direction of rotation of the body 12 around the axis.

During the next half-cycle 62 of the driving signal 16, and with the body 12 rotating in the same direction (as indicated by the arrow 92 in FIG. 3B), the excursion of the toroid 54 may be radially inward. The radius of gyration of the section 91 decreases whereupon the Coriolis effect imparts the accelerative force 50 to the section. The accelerative force 50 advances the fixed end 75 of the second sensor 32 in the direction of rotation and relative to the free end 76 and, as a result, effects a condition of stress in the second sensor 32. In response to the condition of stress, the second sensor 32 flexes in the opposite direction and generates a pulse 99 (FIG. 1), the phase and amplitude of which are proportional to the rate of rotation of the body 12 around the Z axis. The second meter 98 is responsive to the pulse 99 for indicating the rate and direction of the rotation of the body 12 around the Z axis.

Attention is now directed to FIG. 4A for a detailed description of the third sensor 33 and its operation upon rotation of the body 12 around the X axis. The third sensor 33 is so mounted that the adjacent faces of the strips 70 and 71 thereof are parallel to the X-Z plane, rendering the third sensor 33 sensitive to rotation of the body 12 around the X axis. Upon such rotation of the body 12 at an unknown rate around the X axis, the toroid 54 and the third sensor 33 rotate around the X axis at the same rate. As the toroid 54 rotates at such rate, the cyclic excursion of a section 53 of the toroid 54 effects a cyclic change in the radius of gyration thereof. Such change in the radius of gyration imparts the cyclically acting, accelerative and decelerative forces 50 and 51, respectively, to the section 53 as a result of the Coriolis effect.

As shown in FIG. 4A, with the body 12 rotating in the direction of the arrow 101 and during a first half cycle 61 of the input signal 16, the excursion of the toroid 54 may be radially outward, for example. During such radially outward excursion, the decelerative force 51 is applied to the section 53. Because the free end 76 of the third sensor 33 is a nodal point, it continues to rotate at the known rate. The fixed end 75, which is the anti-nodal point of the third sensor 33, decelerates with the section 53 under the action of the force 51, and, as a result, effects a condition of stress in the sensor 33. In response to the condition of stress, the third sensor 33 flexes, as shown in FIG. 4A, and generates a pulse 102 (FIG. 1).

Leads 104 and 106 (FIG. 1), adhesively connected to the fixed end 75 of the third sensor 33 for electrical and mechanical contact therewith, conduct the pulse 102 to the circuit 44. A third meter 107 energized by the circuit 44 is responsive to the phase and amplitude of the pulse 102 for indicating the rate and direction of rotation of the body 12 around the X axis.

During the next half cycle 62 of the input signal 16, and with the body 12 rotating in the same direction as indicated by the arrow 101 in FIG. 4B, the excursion of the toroid 54 may be radially inward. The radius of gyration of the section 53 decreases whereupon the Coriolis effect imparts the accelerative force 50 to the section 53. The section 53 accelerates the fixed end 75 of the third sensor 33 relative to the fixed end 76 and, as a result, effects a condition of stress in the third sensor 33.

In response to the condition of stress, the third sensor 33 flexes in the opposite direction (FIG. 4B) and generates a pulse 110 (FIG. 1), the phase and amplitude of which are proportional to the rate of rotation of the body 12 around the X axis. The third meter 107 responds to the pulse 110 for indicating the rate and direction of rotation of the body 12 around the X axis.

Referring now to FIG. 5, there is shown a schematic diagram of the circuit 44. The details of an input circuit 111 are shown in the diagram of FIG. 5 in conjunction with only one rate circuit 112 for sensing rotation of the body 12 around the Y axis, for example. It is to be understood, however, that rate circuits 113 and 114, provided for sensing rotation of the body around the X and Z axes, respectively, are similar to the rate circuit 112.

The input signal 16 is generated by the oscillator 59 for driving the driven member 14. As above-described, upon rotation of the body 12 around the Y axis and upon application of the input signal 16 to the driven member 14, the Y axis output signal 41 is generated by the first sensor 31. It may be understood that the Y axis output signal 41 is formed by the successive pulses 82 and 87 which are generated by the first sensor 31 upon rotation of the body 12 around the Y axis. As shown in FIG. 5, the Y axis output signal 41 and the input signal 16 are applied to amplifiers 116 and 117, respectively. The amplified signal 16 is applied to a clipper shaper 121 for producing a shaped pulse 122. The shaped pulse 122 is applied to a phase splitter 123 which generates phase opposed signals 124 and 125.

The amplified signal 41 is applied to a phase splitter 127 which generates phase opposed signals 128 and 129. The signals 124, 125, 128 and 129 are impressed on a full wave synchronous switch 131 which generates a rate signal 132 having an amplitude proportional to the rate of rotation of the body 12 around the Y axis and a polarity indicative of the direction of such rotation. In a similar manner, the rate circuits 113 and 114 are effective to energize full wave synchronous switches 133 and 134 for producing X and Z rate signals 135 and 136, respectively, which energize the second and third meters 98 and 107, respectively.

Attention is now directed to FIG. 6 where a portion of the full wave synchronous switch 131 suitable for producing the Y axis rate signal 132 is shown including a conductor 141 for impressing the input signal 124 on a base 142 of a first transistor 143, such as a bilateral switch. A conductor 144 is provided for impressing the output signal 128 on an emitter 145 of the transistor 143. A conductor 146 connects a collector 147 of the transistor 143 to the first meter 85.

Similarly, a conductor 151 is provided for impressing the input signal 125 on a base 152 of a second transistor 153, which may be of the same type as the first transistor 143. A conductor 154 is provided for applying the output signal 129 to an emitter 155 of the transistor 154, whereas a collector 157 thereof is connected to the first meter 85 by the conductor 146.

In operation, during the first half cycle 61 of the input signal 16 from the oscillator 59, the conductor 151 impresses a negative portion of the input signal 125 on the base 152 rendering the transistor conductive. Upon conduction, the transistor 153 passes a portion of the output signal 129, a positive portion for example, in the form of the rate signal 132, to the first meter 85 which indicates the rate and direction of rotation of the body 12 around the Y axis.

During the next half cycle of operation, the input signal 125 goes positive, rendering the transistor 153 nonconductive, whereas the input signal 124 goes negative, rendering the transistor 143 conductive. At this time a positive going portion, for example, of the output signal 128 that is impressed on the emitter 155 is passed in the form of the rate signal 132, to the first meter 85. In response to the rate signal 132, the first meter 85 indicates the rate of rotation in the same direction.

When rotation of the body 12 in a first direction is indicated by the first meter 85 as a positive reading, for example, rotation in a second direction, opposite to the first direction, is indicated as a negative meter reading.

Referring now to FIG. 7, there is shown a magnified illustration of an embodiment 210 of the gyroscopic system 11 that is suitable for commercial application. A detailed description of the embodiment 210 is hereafter presented as an illustration of the substantially two-dimensional, miniature configuration of the system 11. It is to be understood, however, that the described embodiment does not reflect the fullest extent of miniaturization thereof that may be rendered possible by more refined manufacturing facilities, because the embodiment was fabricated manually for demonstration purposes. Thus, a unit 213, similar to the unit 13, may be constructed of more minute dimensions so long as all of the driven and sensor components of the unit are adapted to resonate at the same frequency.

The embodiment 210 may be housed in a container 195, such as an extremely thin, two-part, disc-like can. When top and bottom halves 196 and 197, respectively, of the container 195 are assembled, the container has a width in the direction of the Y axis of approximately 0.30 inch and a radius of approximately 1.55 inches. Because the container 195 is very thin and, hence substantially occupies only two dimensions, the container may be referred to as substantially two-dimensional. The bottom half 197 is secured to the body 12 (FIG. 1) so that the orthogonal axes X, Y and Z of the body are parallel to the respective reference axes of the unit. For simplicity of description, the orthogonal and reference axes are shown coincident.

A resilient support, such as an artificial rubber member 215, is provided with a central aperture 216 for receiving a mounting rod 216A that is rigidly mounted on the bottom half 197 of the container 195 and is coaxial with the Y axis. The resilient support 215 is provided with an equilateral cross section so that the corners 215A thereof may adhesively engage and support the inner wall 257 of a driven member 214 of the unit 213. The driven member 214 is annular in configuration, having the form of a toroid or ring 254, and is constructed from barium titanate piezoelectric material of the piezo-ceramic type. The toroid 254 may have inside and outside diameters of approximately 1.6 and 2.0 inches, respectively, and a thickness of approximately 0.25 inch, and is in this sense substantially two-dimensional.

Leads or conductors 256 are electrically and mechanically secured to the inner and outer peripheral surfaces 257 and 225, respectively, for supplying the input signal 16 from the oscillator 59 to the toroid 254. The toroid 254 is excited by the input signal 16 at its resonant frequency of approximately 31 kc. and in its radial mode for experiencing oscillatory excursion in the X–Z plane. The radius of gyration of the toroid 254 varies cyclically as a result of the oscillatory excursion.

First, second and third sensors 231, 232 and 233, respectively are adhesively secured to the outer periphery 225 of the toroid 254 at 90° intervals in the manner that the respective sensors 31, 32 and 33 are secured to the toroid 54. The senors 231 232 and 233 are fabricated from barium titanate bimorphic elements 273, 278 and 279, respectively, each having a square cross section and provided with 0.030 inch sides. Each of the elements 273, 278 and 279 is approximately 0.485 inch long and resonates in the longitudinal and radial modes at approximately the 31 kilocycle per second frequency of the input signal 16. Additionally, the elements 273, 278 and 279 are polarized, as shown in FIG. 7, so that the adjoining faces of the elements are both minus and the outer faces are positive, i.e., plus-minus—minus-plus.

A balance member 246, having the same mass and dimensions as the sensors 231, 232 and 233, is secured to the toroid 254 opposite from the second sensor 232 and spaced 90° from both the first and third sensors 231 and 233, respectively, for dynamically balancing the unit 213.

The operation of the embodiment 210 is substantially the same as the operation of the unit 13 in that, upon simultaneous rotation of the body 12 around the X, Y, and Z axes and in direction of the arrows 249, accelerative and decelerative forces 250 and 251, respectively, are experienced by sections 252, 253 and 291 of the toroid 254 in response to the Coriolis effect. In response to the forces 250 and 251, the sections impart a condition of stress in each of the sensors 231, 232 and 233. The sensors 231, 232 and 233 generate first, second and third output signals 241, 242, and 243, respectively, when subjected to the condition of stress, whereupon the circuit 44 produces the rate signals 132, 135 and 136 which are indicative of the rate of rotation of the body 12 around the Y, X and Z axes, respectively.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In a device for sensing movement of a body around each of a plurality of orthogonal axes,
   a plurality of sensor means, one of said sensor means being positioned perpendicular to each of said axes for generating an output signal in response to a condition of stress therein;
   means for supplying an oscillatory input signal;
   generally disc-like means mounting the plurality of sensor means in said perpendicular positions, said disc-like means driven by said oscillatory input signal for effecting said condition of stress in each sensor means upon rotation of the body around each of said axes; and
   means responsive to the output signals generated by the sensor means for indicating the rate of rotation of said body around said axes.

2. In a device for sensing rotation of a body around each of a plurality of mutually perpendicular axes, wherein said axes define at least one reference plane,
   a plurality of sensor means mounted in said reference plane, one of said sensor means provided for each of said axes for generating a signal in response to a condition of stress therein;
   annular means adapted to vibrate in said reference plane for supporting said plurality of sensor means in said reference plane;
   means mounting said annular means in said reference plane for rotation with said body to rotate said sensor means upon rotation of said body;
   means for vibrating said annular means in said reference plane to render said annular means effective upon rotation of said body to impress said condition of stress on each of said sensor means; and
   means responsive to the signals generated by said sensor means for indicating the rate of rotation of the body around said axes.

3. In a device for sensing rotation of a body around each of first, second and third mutually perpendicular axes,
   first sensor means positioned in a plane perpendicular to said first axis for generating a first signal in response to a condition of stress therein;
   second sensor means positioned in said plane perpendicular to said second axis for generating a second signal in response to a condition of stress therein;
   third sensor means positioned in said plane perpendicular to said third axis for generating a third signal in response to a condition of stress therein;
   a piezoelectric toroid mounting said first, second and third sensor means in said perpendicular positions in said plane;
   means for supporting said toroid on said body in said plane to impart rotation of said body to said toroid and to said first, second and third sensor means;
   means for driving said toroid in said plane to cyclically bias each of said first, second and third sensor means in support of and in opposition to the rotation thereof around the respective first, second and third axes so that said condition of stress is cyclically effected in said first, second and third sensor means; and
   means responsive to said first, second and third signals generated in response to said cyclic conditions of stress for indicating the rate of rotation of said body.

4. In a device for sensing yaw, pitch and roll movements of a body,
   a plurality of bimorphic elements, each of said elements adapted to generate a rate signal in response to a condition of stress therein, one of said elements being oriented for sensitivity to each of said yaw, pitch and roll movements of said body;
   a piezoelectric ring for mounting at 90° intervals around the periphery thereof said plurality of bimorphic elements in said oriented positions;
   support means mounting said ring to said body for imparting said yaw, pitch and roll movements of said body to said ring;
   means for driving said ring to effect the conditions of stress in said bimorphic elements upon said yaw, pitch and roll movements of said body;
   means responsive to the rate signals generated by said bimorphic elements for indicating the rate of said yaw, pitch and roll movements of said body.

5. In a device for sensing the rate of rotation of a body around three mutually perpendicular axes of sensitivity, wherein first and second of said axes define a reference plane,
   a piezoelectric toroid mounted in said reference plane and intersected at first, second and third points by said first and second axes;
   a plurality of elongated bimorphic elements, each of said elements having longitudinal and transverse axes and adapted to generate an output signal in response to flexure thereof in the direction of said transverse axis, one of said elements mounted to said toroid at each of said points of intersection so that the longitudinal axis thereof is positioned in said reference plane and the transverse axis thereof is perpendicular to one of said axes of sensitivity;
   means for exciting the toroid for vibration in said reference plane to condition the toroid for experiencing a Coriolis force at each of said points of intersection upon rotation of the body around each of said axes;
   means mounting the toroid to the body for imparting rotation of said body around each of said axes to said toroid to render said Coriolis forces effective to flex each of said bimorphic elements; and
   means responsive to the signals generated by the flexed bimorphic elements for indicating the rate of rotation of said body around said axes of sensitivity.

6. In a device for simultaneously sensing the rate of rotation of a body around three mutually perpendicular axes, wherein first and second of said axes define a reference plane,
   a piezoelectric ring mounted in said reference plane and intersected at first, second and third points by said first and second axes;
   a plurality of elongated bimorphic elements, each of said elements having a transverse axis, each of said elements having a first end corresponding to an antinodal point and a second end corresponding to a nodal point, one of said elements mounted at the first end thereof to said ring at each of said points of intersection so that the second end thereof is positioned in the reference plane and the first end is adapted to vibrate in the direction of said transverse axis, each of said bimorphic elements adapted to generate a signal in response to said vibration of the first end thereof;

means for vibrating the ring in the radial mode thereof in said reference plane for conditioning the ring for flexure at each of said points of intersection in response to Coriolis forces imparted to the ring upon rotation of the body around each of said axes;

means mounting the toroid to the body for imparting rotation of the body to the ring to effect said flexure of the ring upon rotation of the body and vibrate the first end of each of the bimorphic elements; and means responsive to the signals generated by the vibrating bimorphic elements for indicating the rate of rotation of said body around said axes.

References Cited by the Examiner

UNITED STATES PATENTS 2,627,400  2/53  Lyman _____ 73—517
2,683,247  7/54  Wiley _____ 73—517

RICHARD C. QUEISSER, *Primary Examiner.*

JAMES J. GILL, *Examiner.*